United States Patent [19]
Hamada et al.

[11] Patent Number: 5,671,909
[45] Date of Patent: Sep. 30, 1997

[54] OSCILLATING ROD MEMBER EQUIPPED WITH DYNAMIC DAMPER

[75] Inventors: Masaaki Hamada; Takahiro Aoi, both of Komaki, Japan

[73] Assignee: Tokai Rubber Industries, Ltd., Japan

[21] Appl. No.: 672,658

[22] Filed: Jun. 28, 1996

Related U.S. Application Data

[62] Division of Ser. No. 431,837, May 1, 1995, Pat. No. 5,593,144.

[30] Foreign Application Priority Data

May 13, 1994 [JP] Japan ................. 6-099551
Oct. 13, 1994 [JP] Japan ................. 6-247545

[51] Int. Cl.$^6$ ........................ F16F 7/00
[52] U.S. Cl. .............. 267/141; 267/141.2; 267/293; 188/379; 384/125; 464/180
[58] Field of Search ............... 267/141, 141.2, 267/293, 281; 188/378, 379; 248/559; 384/125; 74/604; 180/381; 464/180, 83; 123/192 R, 192 A; 295/36.1

[56] References Cited

U.S. PATENT DOCUMENTS

| | | | |
|---|---|---|---|
| 1,775,403 | 9/1930 | McLeod | 384/125 |
| 1,934,597 | 11/1933 | Föppl | 74/6 |
| 3,319,918 | 5/1967 | Rapata | 267/141 |
| 3,771,846 | 11/1973 | Bass et al. | 308/238 |
| 4,158,407 | 6/1979 | Rest | 206/318 |
| 4,223,565 | 9/1980 | Sugiyama et al. | 74/574 |
| 5,056,763 | 10/1991 | Hamada et al. | 267/141 |
| 5,090,668 | 2/1992 | Hamada | 267/141 |
| 5,145,155 | 9/1992 | Funahashi et al. | 267/141 X |

FOREIGN PATENT DOCUMENTS

| | | |
|---|---|---|
| 356917 | 3/1990 | European Pat. Off. . |
| 409202 | 1/1991 | European Pat. Off. . |
| 409704 | 1/1991 | European Pat. Off. ........ 267/293 |
| 2-129431 | 5/1990 | Japan . |
| 2-190641 | 7/1990 | Japan . |
| 3-37450 | 2/1991 | Japan . |
| 4321420 | 11/1992 | Japan ........ 267/141.2 |
| 1040109 | 8/1966 | United Kingdom . |

OTHER PUBLICATIONS

Patent Abstracts of Japan, vol. 17, No. 350 (M–1438) Jul. 2, 1993 & JP–A–05 055 559 (Bridgestone) Feb. 23, 1993.
Patent Abstracts of Japan, vol. 16, No. 416 (M–1304) Sep., 2, 1992 & JP–A–04 140 536 (Mazda) May 14, 1992.
Patent Abstracts of Japan, vol. 14, No. 295 (M–990) Jun. 26, 1990 & JP–A–02 093 155 (Fuji) Apr. 3, 1990.

*Primary Examiner*—Peter M. Poon
*Attorney, Agent, or Firm*—Parkhurst, Wendel & Burr, L.L.P.

[57] ABSTRACT

A rod-damper combination comprising an oscillating rod member and a dynamic damper mounted on the rod member is disclosed. The dynamic damper includes a mass portion having a substantially cylindrical shape, and two elastic support members formed on axially opposite sides of the mass portion to elastically support the mass portion. The oscillating rod member includes a small-diameter portion formed at an axially middle portion thereof, and two large-diameter portions formed on axially opposite sides of the small-diameter portion. Alternatively, the rod member includes a middle portion, and two tapered portions on axially opposite sides of the middle portion. The two elastic support members of the dynamic damper are mounted on the two large-diameter or tapered portions of the oscillating rod member, respectively.

7 Claims, 8 Drawing Sheets

OSCILLATING ROD MEMBER EQUIPPED WITH DYNAMIC DAMPER

This is a Division of application Ser. No. 08/431,837 filed May 1, 1995 now U.S. Pat. No. 5,593,144.

BACKGROUND OF THE INVENTION

1. Field of the Invention

The present invention relates to a hollow or solid rod member which is subject to oscillation and which is a member of a vibration transmitting system such as shafts, arms, or conduits used in various devices, and more particularly to such an oscillating rod member which is equipped with a dynamic damper for restraining or absorbing vibrations of the oscillating rod member.

2. Discussion of the Related Art

Various kinds of rod members such as shafts or arms functioning as a power transmitting members and such as conduit or pipes serving as a fluid passage generally tend to oscillate or vibrate and consequently resonate due to an external oscillating force. Further, the rod member undesirably transmits a vibration excited therein to other components of a device in which the rod member is used. As a method to cope with these problems, a dynamic damper is attached to the rod member for preventing the resonance of the rod member and the transmission of the excited vibration of the rod member to the other components.

There have been proposed various types of such dynamic dampers adapted to be installed on the oscillating rod member as described above so as to exhibit effective damping characteristics with respect to a bending vibration and a torsional vibration of the rod member. Examples of such a dynamic damper for use with a drive shaft of a motor vehicle are disclosed in U.S. Pat. No. 5,056,763 assigned to the assignee of the present application and laid-open Publication No. 2-190641 of unexamined Japanese Patent Application, wherein the dynamic damper has a mass member having a generally cylindrical configuration and elastic support members formed on axially opposite sides of the mass member. The disclosed dynamic damper is inserted onto a vehicle drive shaft as an oscillating rod member and secured thereto at the elastic support members.

In the thus constructed dynamic damper, an inside diameter of the elastic support members is suitably determined according to an outside diameter of the oscillating rod member on which the dynamic damper is installed, so that the inner circumferential surfaces of the elastic support members are fixed in close contact with the corresponding outer circumferential surfaces of the rod member. Further, in order to permit the dynamic damper to exhibit effective damping characteristics with respect to the vibration of the rod member, the resonance frequency of the dynamic damper is properly tuned so as to damp or absorb the input vibration received from the rod member, by suitably adjusting the mass of the mass member and the spring constant of the elastic support members.

However, the oscillating rod member is required to have a sufficiently high mechanical strength and excellent durability while making it possible to reduce the overall weight thereof and to lower the manufacturing cost. In view of these requirements, the oscillating rod member is often subject to alterations in dimensions such as the outside diameter so as to meet a slight change in the specifications of the device in which the rod member is used. In this case, the oscillating rod members do not have the same dimensions even if the rod members are employed in the same type of the device.

The slight alterations in the dimensions or design of the rod members undesirably change the resonance frequencies of the associated components, and consequently change the frequency of vibration of the rod member to be damped. Thus, it has been quite difficult to use the same dynamic dampers for the rod members whose dimensions slightly differ from each other. Accordingly, it has been required to design and produce a specific dynamic damper for each of the different rod members.

Described more specifically, a drive shaft for a motor vehicle adapted to transmit a driving torque from a final speed reduction gear unit to driving wheels is usually equipped with a dynamic damper for damping the vibration of the drive shaft which arises from a variation in the rotating torque received from the final gear unit, to minimize such vibration that adversely influences ride comfort of the motor vehicle and durability of the components which are subject to the vibration. However, the drive shafts generally have different values of the outside diameter and oscillating frequency to be damped, depending upon models of the motor vehicles, more specifically, depending upon the engine output characteristics of the vehicles, for instance. Therefore, the dimensions of the dynamic damper are conventionally designed such that the mass of the mass member and the spring constant of the elastic support members of the dynamic damper are tuned or adjusted to the individual drive shafts, depending upon the outside diameter and oscillation frequency of the drive shaft on which the dynamic damper is installed.

Thus, the conventional oscillating rod members require respective dynamic dampers specifically adapted thereto, leading to increased costs of design and manufacture of the rod members equipped with the dynamic dampers.

SUMMARY OF THE INVENTION

It is therefore an object of the present invention to make it possible to use the same dynamic damper for different oscillating rod members which have different outside diameters and different oscillation frequencies to be damped, while enabling the dynamic damper to exhibit an intended damping effect with respect to the vibrations of the rod members.

The above object may be attained according to a first aspect of the present invention which provides a rod-damper combination comprising an oscillating rod member and a dynamic damper including a mass portion having a substantially cylindrical shape, and two elastic support members formed on axially opposite sides of the mass portion to elastically support the mass portion with respect to the rod member, the dynamic damper being mounted on the rod member such that the mass portion of the dynamic damper is disposed diametrically outwardly of the rod member by a suitable distance, wherein the improvement comprises: the oscillating rod member including a small-diameter portion formed at a prescribed portion where the dynamic damper is mounted, and two large-diameter portions formed on axially opposite sides of the small-diameter portion, respectively; and the two elastic support members of the dynamic damper being mounted on the two large-diameter portions of the oscillating rod member, respectively.

In the oscillating rod member with the dynamic damper constructed according to the first aspect of the invention, the outside diameter of the two large-diameter portions can be suitably determined depending upon the inside diameter of the elastic support members of the dynamic damper mounted on the oscillating rod member. According to this arrangement, it becomes unnecessary to change the inside diameter of the elastic support members of the dynamic damper depending upon the various types of the oscillating rod members, i.e., depending upon the various outside diameter dimensions of the rod members. Therefore, the dynamic dampers whose elastic support members have the same inside diameter can be mounted on the various types of the oscillating rod members. Described in detail, since the two large-diameter portions of the oscillating rod member are not the portions having the smallest outside diameter of the rod member, the outside diameter of the large-diameter portions do not directly affect the mechanical strength of the rod member. In view of this fact, the outside diameter of the large-diameter portions of the rod member can be determined so as to fit the inside diameter of the elastic support members of the dynamic damper to be mounted on the rod member. That is, the different rod members having different dimensions so as to meet the required mechanical strength can be formed so that their large-diameter portions have the same diameter.

In the oscillating rod member as described above, the dynamic damper is installed on the rod member such that the inner circumferential surfaces of the elastic support members of the damper are closely fitted on the respective outer circumferential surfaces of the large-diameter portions of the rod member. In this arrangement, the axial length of the small-diameter portion, that is, the axial distance between the two large-diameter portions whose outer circumferential surfaces are held in abutting contact with the respective inner circumferential surfaces of the elastic support members of the dynamic damper is adjusted as desired to adjust the binding forces which act on the elastic support members due to the contact with the respective large-diameter portions. Therefore, the spring constant of the elastic support members, and consequently, the resonance frequency of the dynamic damper can be changed as desired. In other words, the dynamic dampers having the same mass of the mass member and the same spring constant of the elastic support members can be used for various types of oscillating rod members, by suitably adjusting the axial length of the small-diameter portions. In this arrangement, therefore, the resonance frequency of the dynamic damper can be tuned as desired depending upon the oscillation frequency of the rod member on which the dynamic damper is installed.

As can be understood from the above explanation, the rod members whose large-diameter portions have the same diameter and whose other portions have different dimensions may use the same dynamic dampers which have the same spring constant of the elastic support members, the same dimensions and mass of the mass portion as well as the same dimensions of the elastic support members. In other words, the same dynamic dampers can be installed on the various types of the rod members having different outside diameter dimensions, different axial length values and different oscillation frequencies to be damped, while assuring effective damping characteristics with respect to the input vibrations.

In the oscillating rod member constructed according to a first preferred form of the first aspect of the invention, the two large-diameter portions of the rod member are formed integrally with the other portions of the rod member. This arrangement leads to reduction in the number of required components and improved assembling efficiency of the rod member. Further, the dynamic damper installed on the thus constructed rod member does not suffer from a deviation of its tuned resonance frequency due to an error during assembling of the rod member, whereby the dynamic damper exhibits the intended damping effect with high stability.

The oscillating rod member constructed according to a second preferred form of the first aspect of the invention further includes two small-diameter axial sections formed adjacent to axially outer ends of the two large-diameter portions, respectively, the two small-diameter axial sections having diameters smaller than a diameter of the two large-diameter portions. This arrangement contributes to reduction in the overall weight of the rod member and offsets a weight increase due to the provision of the large-diameter portions.

In the oscillating rod member constructed according to a third preferred form of the first aspect of the invention, the two large-diameter portions have a largest diameter which is not smaller than a largest diameter of the other portions of the oscillating rod member. This arrangement permits easy installation of the dynamic damper on the outer circumferential surface of the rod member.

According to a fourth preferred form of the first aspect of the present invention, the dynamic damper comprises engaging means for positioning the dynamic damper with respect to the oscillating rod member in an axial direction thereof. The dynamic damper according to this feature of the invention is easily positioned relative to the oscillating rod member upon installation, and further, the dynamic damper is effectively prevented from being moved from its prescribed position after installation on the rod member.

The dynamic damper of the rod member according to a fifth preferred form of the first aspect of the present invention has an inner circumferential surface whose diameter is substantially constant over an entire axial length thereof. The dynamic damper according to this feature is easily formed by vulcanization of an elastic body. Described in detail, when the dynamic damper is formed by vulcanization molding, the vulcanized elastic body giving the dynamic damper is easily removed from a mold. Accordingly, the present dynamic damper is free from a conventionally encountered problem of cracking or other defects, which occur at the elastic support members upon removal of the elastic body from the mold in the conventional dynamic damper wherein the inside diameter of the mass portion is larger than that of the elastic support members.

According to a sixth preferred form of the invention, the oscillating rod member further includes two stepped sections formed between respective axially outer ends of the small-diameter portion and respective inner ends of the two large-diameter portions, the stepped sections having respective tapered outer circumferential surfaces whose outside diameters reduce in axially inward directions of the rod member, while the two elastic support members of the dynamic damper have respective tapered inner circumferential surfaces which are held in abutting contact with the tapered outer circumferential surfaces of the two stepped sections of the oscillating rod member. The tapered outer circumferential surfaces of the stepped sections of the rod member cooperate with the tapered inner circumferential surfaces of the elastic support members of the dynamic damper to permit easier positioning of the damper relative to the rod member in the axial direction. Further, the dynamic damper is effectively prevented from being moved out of position, owing to the abutting contact of the tapered inner surfaces of the elastic support members and the corresponding tapered outer surfaces of the stepped sections of the rod member.

According to a seventh preferred form of the first aspect of the invention, the oscillating rod member includes at least one annular abutting portion formed at an axially intermediate portion of the small-diameter portion, each of the at least one annular abutting portion having an outside diameter larger than that of the small-diameter portion, the mass portion of the dynamic damper having a plurality of sections which are spaced apart from each other by a predetermined distance in the axial direction of the dynamic damper, and further having at least one elastic connecting portion which connects adjacent ones of the plurality of sections of the mass portion, the at least one elastic connecting portion being held in abutting contact with an outer circumferential surface of the at least one annular abutting portion, so that the plurality of sections of the mass portion are elastically supported by the at least one elastic connecting portion. In the dynamic damper according to this feature of the invention, the two or more mass portions constitute respective secondary vibration systems and are differently tuned so as to permit the dynamic damper to exhibit effective damping characteristics with respect to the input vibrations in respective different frequency ranges.

In one arrangement of the oscillating rod member constructed according to the seventh preferred form of the first aspect of the invention, the plurality of sections of the mass portion of the dynamic damper have respective mass members having different masses. In this arrangement, the secondary vibration systems constituted by the respective mass portions can be differently tuned by suitably adjusting the mass of the mass portions.

The above-described object may also be attained according to a second aspect of the present invention which provides a rod-damper combination comprising an oscillating rod member and a dynamic damper including a mass portion having a substantially cylindrical shape, and two elastic support members formed on axially opposite sides of the mass portion to elastically support the mass portion with respect to the rod member, the dynamic damper being mounted on the oscillating rod member such that the mass portion of the dynamic damper is disposed diametrically outwardly of the rod member by a suitable distance, wherein the improvement comprises: the oscillating rod member including a pair of tapered portions formed in an axially spaced apart relation with each other at a prescribed portion where the dynamic damper is mounted, the tapered portions having respective tapered outer circumferential surfaces whose outside diameters reduce in axially outward directions of the rod member; and the two elastic support members of the dynamic damper having respective tapered inner circumferential surfaces which are held in abutting contact with the tapered outer circumferential surfaces of the tapered portions of the rod member, respectively.

In the oscillating rod member with the dynamic damper constructed according to the second aspect of the invention, the outside diameter of the two tapered portions can be suitably determined depending upon the inside diameter of the elastic support members of the dynamic damper mounted on the rod member. In this arrangement, too, it is not necessary to change the inside diameter of the elastic support members of the dynamic damper depending upon the various types of the rod members as discussed above with respect to the first aspect of the invention.

In the rod member as described above, the axial distance defined by and between the pair of tapered portions is adjusted as desired so as to adjust the binding forces which act on the elastic support members of the dynamic damper. Accordingly, the spring constant of the elastic support members, and consequently, the resonance frequency of the dynamic damper can be changed as desired. Thus, this arrangement also permits the dynamic damper having the same mass of the mass member and the same spring constant of the elastic support members to be installed on the various types of the rod members by suitably adjusting the axial distance between the two tapered portions. Therefore, the resonance frequency of the dynamic damper can be tuned as desired as discussed with respect to the first aspect of the invention.

In the rod member equipped with the dynamic damper constructed as described above, too, the same dynamic dampers having the same spring constant of the elastic support members, the same dimensions and mass of the mass portion and the same dimensions of the elastic support members can be installed on the various types of the rod members having different outside diameter dimensions, different axial length values and different oscillation frequencies to be damped. Thus, the rod member with the dynamic damper according to the second aspect of the invention also assures effective damping characteristics with respect to the input vibrations.

In the dynamic damper constructed according to the second aspect of the invention, the elastic support members respectively have the tapered inner circumferential surfaces which are held in abutting contact with the corresponding tapered outer circumferential surfaces of the tapered portions of the rod member, whereby the dynamic damper is installed in position relative to the rod member in an axial direction thereof. Thus, in this arrangement, the dynamic damper is effectively prevented from being moved from its prescribed position after installation on the rod member so that the dynamic damper exhibits the intended spring characteristics of the elastic support members and consequently, the intended damping effect with stability.

The dynamic damper according to this second aspect of the invention is mounted on the rod member with the elastic support members of the damper closely fitted on the corresponding tapered portions of the rod member, owing to the elastic force of the elastic support members. Accordingly, this arrangement permits the dynamic damper to be installed on the rod member with a sufficient fixing force, without using any specific fixing members such as retainer bands for securing the dynamic damper to the rod member.

According to a first preferred form of the second aspect of the invention, the pair of tapered portions of the rod member are formed integrally with the other portions of the rod member. This arrangement assures the same advantages as discussed above with respect to the rod member equipped with the dynamic damper according to the first preferred form of the first aspect of the invention.

In the rod member according to a second preferred form of the second aspect of the invention, the pair of tapered portions of the rod member have a largest diameter which is not smaller than a largest diameter of the other portions of the rod member. This arrangement permits easy installation of the dynamic damper on the outer circumferential surface of the rod member.

In the rod member according to a third preferred form of the second aspect of the invention, a middle portion of the rod member defined by and between the pair of tapered portions has a diameter substantially equal to the largest diameter of said tapered portions. This arrangement permits the dynamic damper to be easily press fitted onto the outer circumferential surface of the rod member.

According to a fourth preferred form of the second aspect of the invention, the middle portion of the rod member defined by and between the pair of tapered portions has a diameter smaller than the largest diameter of the tapered portions. This arrangement is effective to reduce the overall weight of the rod member.

In the dynamic damper according to a fifth preferred form of the second aspect of the invention, the two elastic support members have respective tapered outer circumferential surfaces whose outside diameters reduce in the axially outward directions of the rod member. In this arrangement, the thickness of the elastic support members is substantially constant over an entire axial length thereof.

In the dynamic damper according to a sixth preferred form of the second aspect of the invention, the elastic support members have respective outer extensions which extend from respective axially outer ends of the elastic support members in the axially outward directions of the rod member, the outer extensions being held in abutting contact with respective outer circumferential surfaces of axial portions of the rod member which are formed adjacent to respective axially outer ends of the tapered portions of the rod member. According to this arrangement, the dynamic damper is effectively positioned relative to the rod member in the axial direction thereof, and is prevented from being moved out of position after installation on the rod member, owing to abutting contact of the outer extensions with the above-indicated axial sections of the rod member.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

There will be described some embodiments of the present invention, wherein the principle of the invention is applied to a drive shaft of a motor vehicle.

Figure 1:
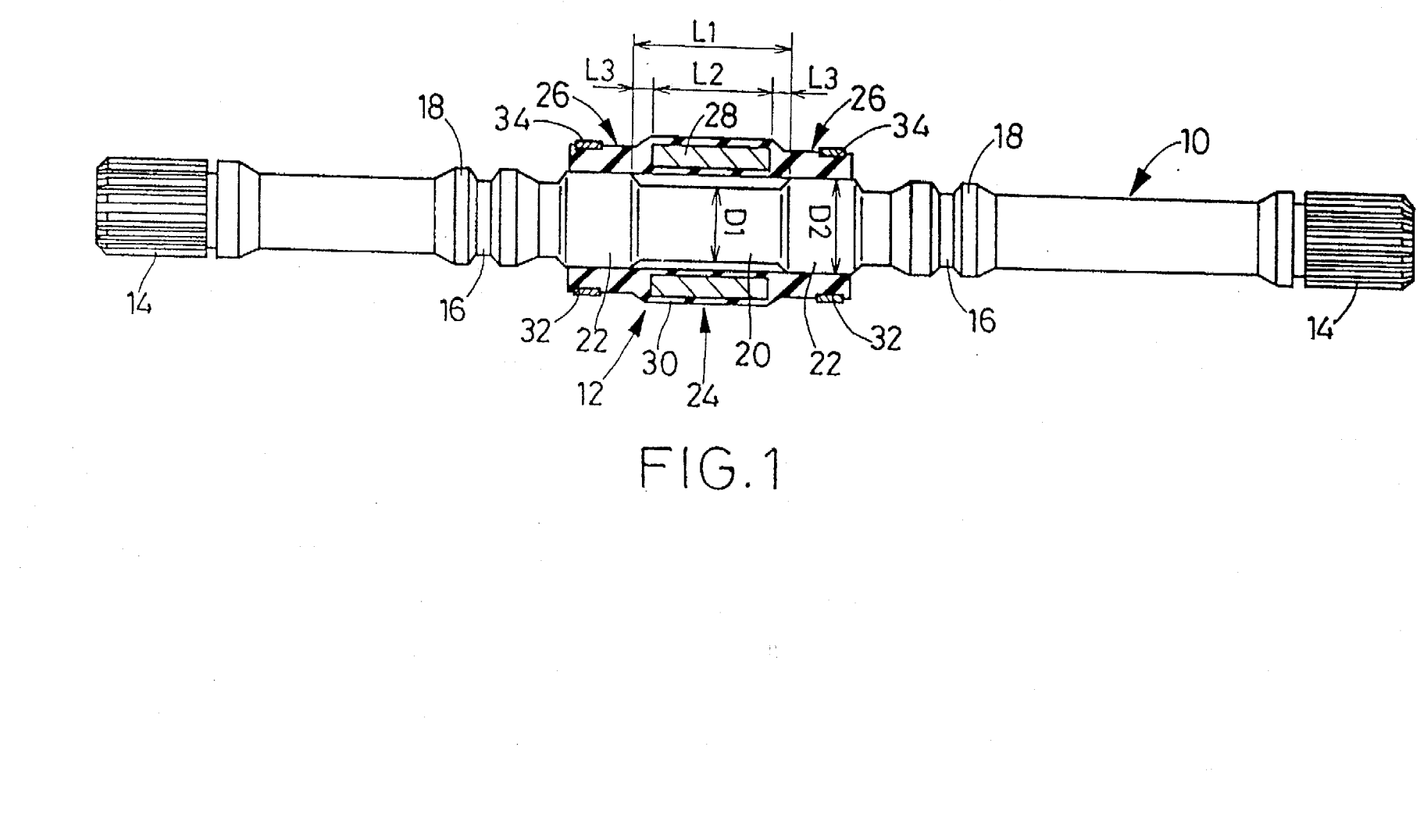
FIG. 1 is an elevational view in longitudinal cross section of a drive shaft equipped with a dynamic damper according to one embodiment of the present invention.

Referring first to FIG. 1, there is shown a drive shaft 10 as an oscillating rod member equipped with a dynamic damper 12 according to the first embodiment of the present invention. In FIG. 1, only the dynamic damper 12 is shown in longitudinal cross section.

The drive shaft 10 is a generally long red member which is hollow or solid and which has a circular shape in transverse cross section. The drive shaft 10 has splined connecting portions 14, 14 having a large diameter formed at axially opposite ends thereof and engaging portions 18, 18 each of which is formed axially inwardly of the respective connecting portions 14, 14 by a predetermined distance. Each of the engaging portions 18, 18 has a relatively large diameter and has a groove 16 at an axially middle portion thereof. In the present drive shaft 10, there are attached universal joints (not shown) to the respective splined connecting portions 14, 14. One of the connecting portions 14, 14 is linked to an output shaft of a final speed reduction gear of a motor vehicle while the other is linked to a driving wheel of the motor vehicle, via the respective universal joints. The connecting portions 14 are covered by protecting covers and one of the opposite ends of each protecting cover is engaged with the groove 16 of the corresponding engaging portion 18.

The dynamic damper 12 is installed on a substantially axially middle portion of the above-constructed drive shaft 10. As shown in FIG. 1, at the axially middle portion of the drive shaft 10 where the dynamic damper 12 is installed, there are formed a small-diameter portion 20 having an axial length L1 and an outside diameter D1, and large-diameter portions 22, 22 which are formed on the axially opposite sides of the small-diameter portion 20, so as to extend from the small-diameter portion 20 over a suitable axial length, respectively. The large-diameter portions 22 have an outside diameter D2 which is larger than the diameter D1 of the small-diameter portion 20. Each of the large-diameter portions 22 of the present embodiment is formed integrally with the small-diameter portion 20 by a suitable method such as drawing, forging or machining. Each of the large-diameter portions 22 has a cylindrical outer circumferential surface having a suitable axial length.

In the present embodiment, the outside diameter D1 of the small-diameter portion 20 is dimensioned such that the diameter D1 is substantially equal to the smallest outside diameter of a portion of the drive shaft 10 other than the portion of installation of the dynamic damper 12 while the outside diameter D2 of the large-diameter portions 22 is dimensioned such that the diameter D2 is substantially equal to the largest outside diameter of the portion of the drive shaft 10 other than the portion of installation of the dynamic damper 12, i.e., substantially equal to the diameter of the connecting portions 14 or the engaging portions 18.

Figure 2:
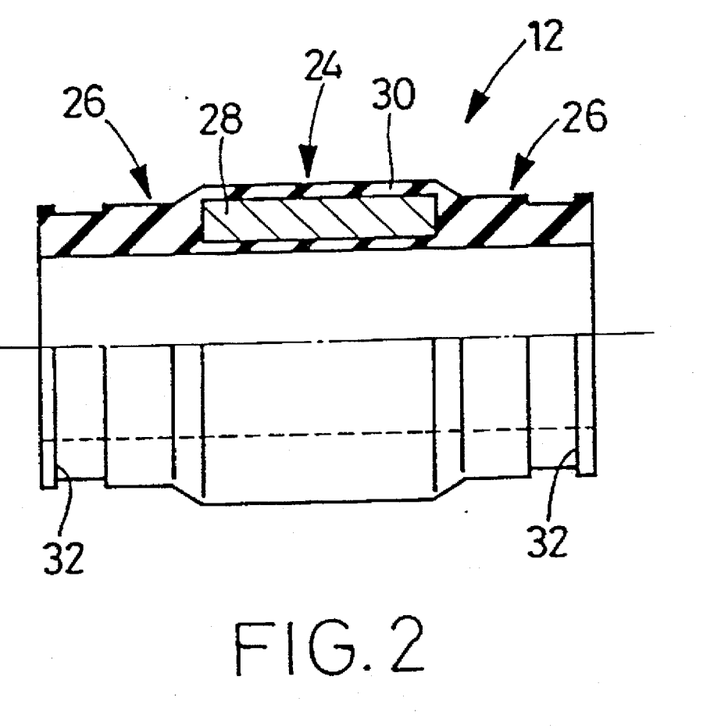
FIG. 2 is a an elevational view in longitudinal cross section of the dynamic damper of FIG. 1.

The dynamic damper 12 installed on the thus-constructed drive shaft 10 has a generally cylindrical shape as shown in FIG. 2 and includes a mass portion 24 formed at an axially middle portion thereof and elastic support members 26, 26 formed integrally with and on the axially opposite sides of the mass portion 24.

The mass portion 24 has a cylindrical mass member 28 formed of a material having a relatively large mass such as a metal, and the outer circumferential surface of the mass member 28 is covered with a thin elastic covering layer 30. The elastic support members 26 are formed of a rubber material such as natural rubber, and have a generally cylindrical or annular shape. The elastic support members 26 are formed so as to extend over a suitable axial length from the respective axially opposite ends of the mass portion 24. Each of the elastic support members 26, 26 has an annular groove 32 formed in an axial end portion of its outer circumferential surface. The annular groove 32 receives a retainer band 34 described later. The elastic covering layer 30 of the mass portion 24 is formed integrally with the elastic support members 26, 26 and is bonded to the outer circumferential surface of the mass member 28 by vulcanization.

In the dynamic damper 12 according to the present embodiment, the inside diameter of the mass portion 24 is made substantially equal to the inside diameter of the elastic support members 26, 26 so that the dynamic damper 12 has a substantially constant inside diameter over the entire axial length thereof. Further, the constant inside diameter of the dynamic damper 12 is made almost equal to or slightly smaller than the outside diameter D2 of the large-diameter portions 22 of the drive shaft 10 on which the present dynamic damper 12 is installed.

The dynamic damper 12 constructed according to the present embodiment is fitted onto the drive shaft 10 from one of opposite axial ends thereof and installed on the drive shaft 10 such that the mass portion 24 of the dynamic damper 12 is axially aligned with the small-diameter portion 20 of the drive shaft 10 while the elastic support members 26, 26 of the dynamic damper 12 are axially aligned with the respective large-diameter portions 22, 22 of the drive shaft 10, as shown in FIG. 1. The dynamic damper 12 is fixed to the drive shaft 10 by means of the retainer bands 34, 34 which are fixedly received in the annular grooves 32, 32 formed in the outer circumferential surfaces of the respective elastic support members 26, 26, so that the elastic support members 26, 26 are fixed to the respective large-diameter portions 22, 22 of the drive shaft 10.

In the present dynamic damper 12, an axial length L2 of the mass member 28 of the mass portion 24 is made smaller than the axial length L1 of the small-diameter portion 20 of the drive shaft 10. According to this arrangement, each elastic support member 26 has an inner extension at an axially inner portion thereof which extends over the end part of the corresponding small-diameter portion 20 of the drive shaft 10 by an axial length L3, as indicated in FIG. 1. In this arrangement, the inner extensions of the elastic support members 26, 26 are not fixed to the outer circumferential surfaces of the large-diameter portions 22, 22, and therefore, these extensions are relatively free from binding forces by the large-diameter portions 22, 22. In other words, the mass portion 24 of the dynamic damper 12 is elastically supported with respect to the drive shaft 10 by these extensions of the elastic support members 26, 26. The extensions of the elastic support members 26, 26 are subject to shear deformation when the mass portion 24 is displaced in the radial direction and in the circumferential direction, due to bending and torsional vibrations received from the drive shaft 10, whereby the dynamic damper 12 exhibits sufficiently soft spring characteristics based on the shear deformation or strain of the extensions of the elastic support members 26, 26.

The dynamic damper 12 installed on the drive shaft 10 as described above constitutes a secondary vibration system in which the mass portion 24 serves as a mass and each of the elastic support members 26, 26 serves as a spring. Thus, the present dynamic damper 12 is capable of exhibiting a damping effect with respect to the torsional and bending vibrations of the drive shaft 10 as a primary vibration system, as in the conventional dynamic damper.

The present drive shaft 10 has the large-diameter portions 22, 22 to which the dynamic damper 12 is fixed at the respective elastic support members 26, 26. This arrangement allows the dynamic dampers 12 having the same dimensions to be installed on various types of the drive shafts which have different outside diameters and axial length values of the connecting portions 14 and engaging portions 18, provided that the large-diameter portions 22, 22 of these drive shafts have the same outside diameter D2.

In the present drive shaft 10 with the dynamic damper 12, the axial length L3 of the inner extensions of the elastic support members 26, 26 of the dynamic damper 12 is adjusted by changing the axial length L1 of the small-diameter portion 20 of the drive shaft 10, whereby the spring constant of the dynamic damper 12 can be suitably tuned as desired.

According to the present embodiment, the dynamic dampers 12 which have the same dimensions and configurations and the same mass of the mass member and the same spring characteristics of the elastic support members as well as the same inside diameter of the elastic support members can be installed on the various types of the drive shaft 10 which have different dimensions, mechanical strength values and oscillation frequencies to be damped. Further, the present dynamic damper 12 is capable of exhibiting an excellent damping effect with respect to the input vibrations when installed on the various types of drive shafts.

Figure 3:
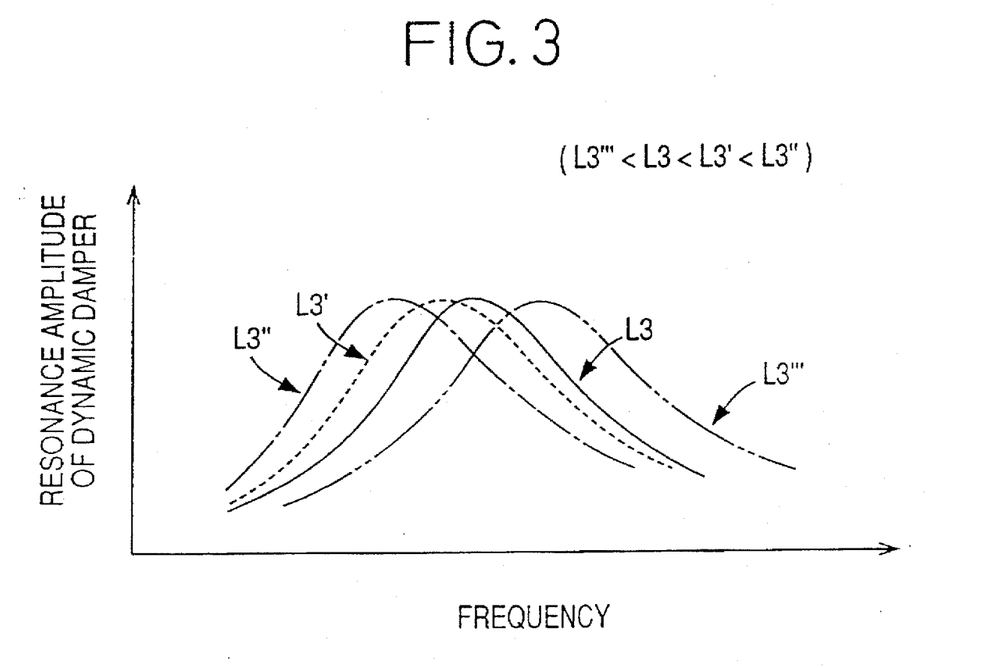
FIG. 3 is a graph for explaining a manner of tuning the resonance frequency of a secondary vibration system constituted by the dynamic damper as installed on the drive shaft of FIG. 1, by adjusting axial length L3 of each inner extension of elastic support members of the dynamic damper.

It is noted that the frequency of the input vibrations that can be effectively damped by the dynamic damper 12 is lowered with an increase in the axial length L3 of the inner extensions of the respective elastic support members 26, 26 over the small-diameter portion 20, as shown in the graph of FIG. 3. In other words, the resonance frequency of the secondary vibration system constituted by the dynamic damper 12 is lowered as the length L3 is increased. The axial length L3 is increased with an increase in the axial length L1 of the small-diameter portion 20 of the drive shaft 10.

In the present embodiment, the large-diameter portions 22, 22 are formed as integral parts of the drive shaft 10. This arrangement favorably eliminates preparation of separate components which provide the large-diameter portions 22, 22 on the shaft 10. Further, the axial length L1 of the small-diameter portion 20 can be established with high accuracy. Thus, the present drive shaft 10 equipped with the dynamic damper 12 advantageously offers the intended damping effect with high stability.

In the drive shaft 10 of the present embodiment, the large-diameter portions 22, 22 have the outside diameter which is substantially equal to the largest diameter of the drive shaft 10. This facilitates the installation of the dynamic damper 12 onto the drive shaft 10 or the assembling of the drive shaft 10 and dynamic damper 12.

In the dynamic damper 12 according to the present embodiment, the mass portion 24 has an inside diameter which is almost equal to that of the elastic support members 26. The dynamic damper 12 of the present invention can be advantageously produced by vulcanization molding. Described in detail, when the dynamic damper 12 is formed by vulcanization of an elastic body, the vulcanized elastic body is easily removed from the mold. Accordingly, the present dynamic damper 12 is free from a conventionally experienced problem of cracking or other defects, which occur at the elastic support members upon removal of the elastic body from the mold in the conventional dynamic damper in which the inside diameter of the mass portion is larger than that of the elastic support members.

The substantially equal inside diameters of the mass portion 24 and the elastic support members 26 make it possible to reduce the outside diameter of the mass portion 24, whereby the dynamic damper 12 as a whole can be made compact and small-sized.

Figure 4:
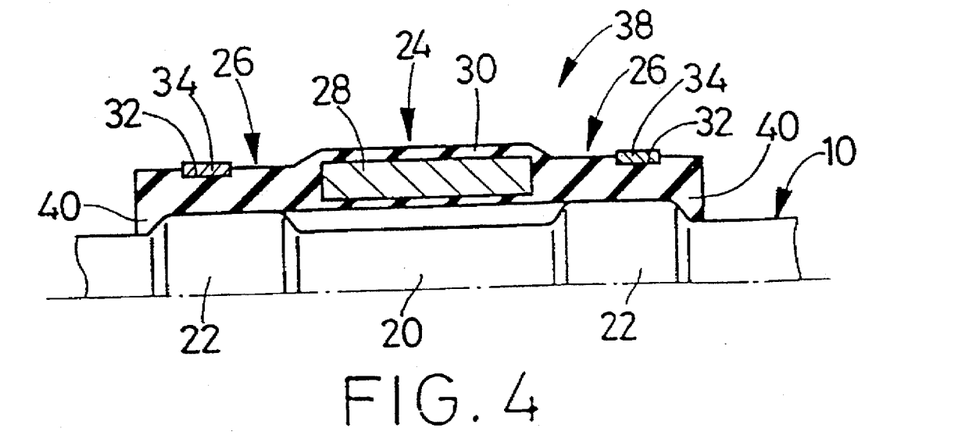
FIG. 4 is an elevational view partly in longitudinal cross section of a dynamic damper according to another embodiment of the invention as installed on the drive shaft of FIG. 1.
Figure 5:
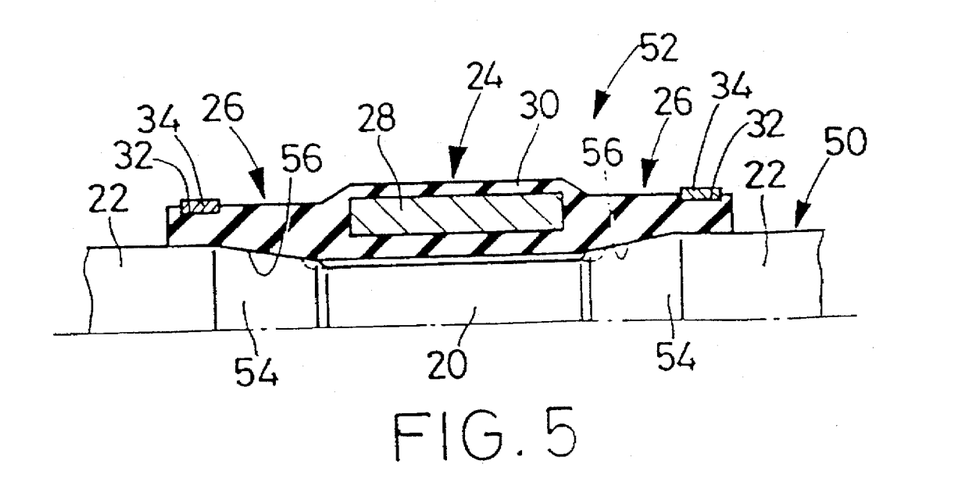
FIG. 5 is an elevational view partly in longitudinal cross section of a dynamic damper as installed on a drive shaft according to still another embodiment of the invention.
Figure 6:
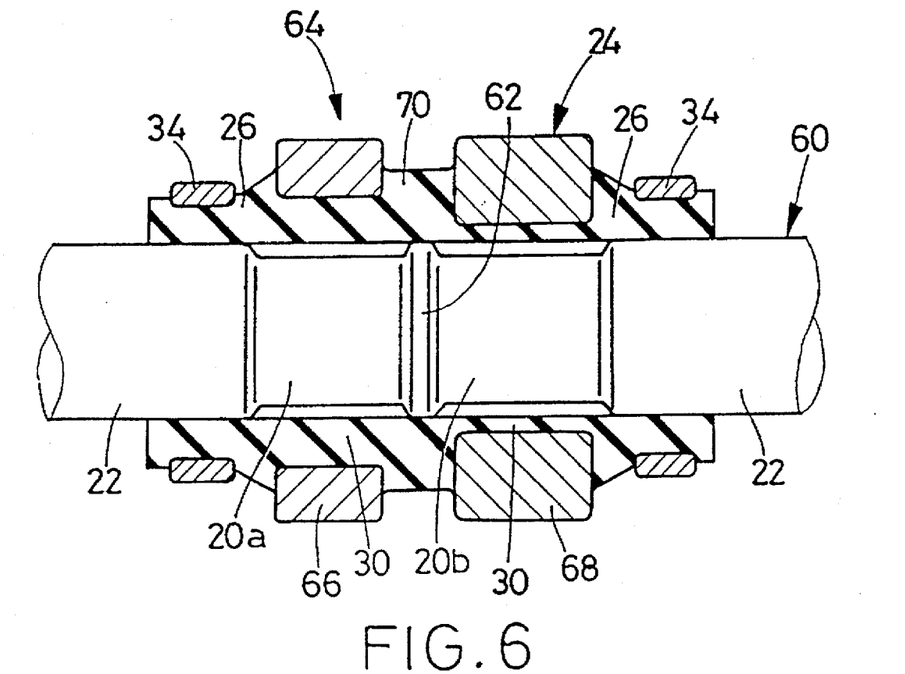
FIG. 6 is an elevational view in longitudinal cross section of a drive shaft equipped with a dynamic damper according to a further embodiment of the invention.

Referring next to FIG. 4, there is shown a dynamic damper according to a second embodiment of the invention which is suitably installed on the drive shaft 10 constructed according to the preceding first embodiment, while FIGS. 5 and 6 respectively show different embodiments of the drive shaft of the invention with a dynamic damper constructed according to the first aspect of the present invention. In the following embodiments, the same reference numerals as used in the first embodiment will be used to identify the corresponding components, and no redundant description of these components will be provided.

In FIG. 4, the dynamic damper according to the second embodiment is generally indicated at 38, wherein a pair of annular protrusions 40, 40 are provided as engaging means. More specifically described, the annular protrusions 40, 40 are formed integrally with the elastic support members 26, 26, such that the protrusions 40, 40 protrude radially inwards at the axially opposite ends of the respective elastic support members 26, 26. When the dynamic damper 38 is installed on the drive shaft 10, the annular protrusions 40, 40 are adapted to be held in engagement with the corresponding axially outer end faces of the respective large-diameter portions 22, 22 of the drive shaft 10.

The thus constructed dynamic damper 38 is favorably and easily installed in position on the drive shaft 10 by the engagement of the annular protrusions 40, 40 of the dynamic damper 38 with the axially outer end faces of the large-diameter portions 22, 22 of the drive shaft 10. Further, this arrangement is effective to prevent the dynamic damper 38 from being moved from the prescribed position after the installation on the drive shaft 10. In addition, since the dynamic damper 38 is fixedly secured to the drive shaft 10 owing to the above engagement, the dynamic damper 38 as the secondary vibration system does not suffer from deviation of the resonance frequency due to a relative change in the axial lengths L3 of the inner extensions of the right and left elastic support members 26, 26. Therefore, the present dynamic damper 38 is free from undesirable reduction in the damping effect which would be caused by the deviation of the resonance frequency from the nominal value.

There will be next described a drive shaft 50 as shown in FIG. 5 according to a third embodiment of the invention. The drive shaft 50 of this third embodiment has two stepped sections formed between respective axially outer ends of the small-diameter portion and respective inner ends of the two large-diameter portions. The stepped sections have respective outer circumferential surfaces which are tapered in the axially inward directions thereof, with the outside diameters of the stepped sections gradually reduced in the axially inward directions, so as to provide tapered outer circumferential surfaces 54, 54. A dynamic damper 52 to be installed on the thus constructed drive shaft 50 has elastic support members 26, 26 whose inner circumferential surfaces are tapered over a suitable axial length from the axially outer ends of the respective elastic support members 26, 26 toward the axially inner ends thereof, with the inside diameters of the elastic support members 26 gradually reduced in the axially inward directions thereof, so as to provide tapered inner surfaces 56, 56.

In the above-constructed drive shaft 50 equipped with the dynamic damper 52, the dynamic damper 52 is installed in position relative to the drive shaft 50 with the tapered inner surfaces 56, 56 of the elastic support members 26, 26 of the dynamic damper 52 closely fitted on the corresponding tapered outer surfaces 54, 54 of the two stepped sections of the drive shaft 50. This arrangement also permits easy positioning of the dynamic damper 52 upon installation thereof on the drive shaft 50 and further, effectively prevents the dynamic damper 52 from being moved out of position after the installation onto the drive shaft 52.

In the present drive shaft 50 of the third embodiment, too, the axial length L1 of the small-diameter portion 20 is adjusted as desired as indicated by phantom lines in FIG. 5, as in the preceding first embodiment, so as to suitably tune the resonance frequency of the secondary vibration system constituted by the dynamic damper 52, depending upon the input vibrations to be damped.

Referring next to FIG. 6, there is shown a drive shaft 60 according to a fourth embodiment of the invention, wherein the small-diameter portion 20 has an annular abutting portion 62 formed at a substantially axially middle portion thereof which extends over its entire circumference and has an outside diameter larger than that of the small-diameter portion 20. The provision of the annular abutting portion 62 divides the small-diameter portion 20 axially into two sections, i.e., a first small-diameter portion 20a and a second small-diameter portion 20b, as indicated in FIG. 6.

As shown in FIG. 6, a dynamic damper 64 to be installed on the above drive shaft 60 has divided mass members, i.e., a first mass member 66 and a second mass member 68 each of which has an annular configuration. The first and second mass members 66, 68 are spaced apart from each other by a predetermined axial distance and are elastically connected to each other by a cylindrical elastic connecting portion 70 interposed therebetween. The first and second mass members 66, 68 are bonded to the elastic connecting portion 70 by vulcanization. In other words, the dynamic damper 64 of this embodiment has divided mass members which are formed such that the mass member 28 of the dynamic damper 12 of the first embodiment is divided into two sections in an axial direction thereof, and such that the two split mass members are spaced apart from each other by a predetermined axial distance and are elastically connected with each other by the elastic connecting portion 70 interposed therebetween. In this preferred fourth embodiment, the first mass member 66 is dimensioned so as to have an axial length smaller than that of the second mass member 68 and an inside diameter larger than that of the second mass member 68, while the second mass member 68 is dimensioned so as to have a larger mass than the first mass member 66.

The thus constructed dynamic damper 64 is mounted in position onto the drive shaft 60 as described above such that the first and second mass members 66, 68 are respectively disposed on the first and second small-diameter portions 20a, 20b, while the elastic connecting portion 70 elastically connecting the first and second mass members 66, 68 is closely fitted on the outer circumference of the annular abutting portion 62.

In the drive shaft 60 with the dynamic damper 64 constructed as described above, the first and second mass members 66, 68 are elastically supported relative to the drive shaft 60 by the elastic support members 26, 26 and the elastic connecting portion 70. This arrangement provides two secondary vibration systems constituted by the first and second mass members 66, 68, respectively. Since the mass of the first mass member 66 is made different from that of the second mass member 68, the resonance frequencies of the two secondary vibration systems constituted by the first and second mass members 66, 68 are accordingly different from each other. Therefore, the dynamic damper 64 having the two secondary vibration systems is capable of exhibiting a remarkable damping effect on the input vibrations having different frequencies.

In the present embodiment, the resonance frequency of the secondary vibration system constituted by the first mass member 66 is tuned so as to be held in a frequency range which is higher than the resonance frequency of the secondary vibration system constituted by the second mass member 68. However, the resonance frequency of the secondary vibration system can be tuned so as to be held in a frequency range which is lower than the resonance frequency of the secondary vibration system constituted by the second mass member 68, by adjusting the spring constant of the elastic support members 26 and the elastic connecting portion 70 which elastically support the first mass member 66 relative to the drive shaft 60, to a value smaller than the spring constant of the elastic support members 26 and the elastic connecting portion 70 which elastically support the second mass member 68 relative to the drive shaft 60.

Figure 7:
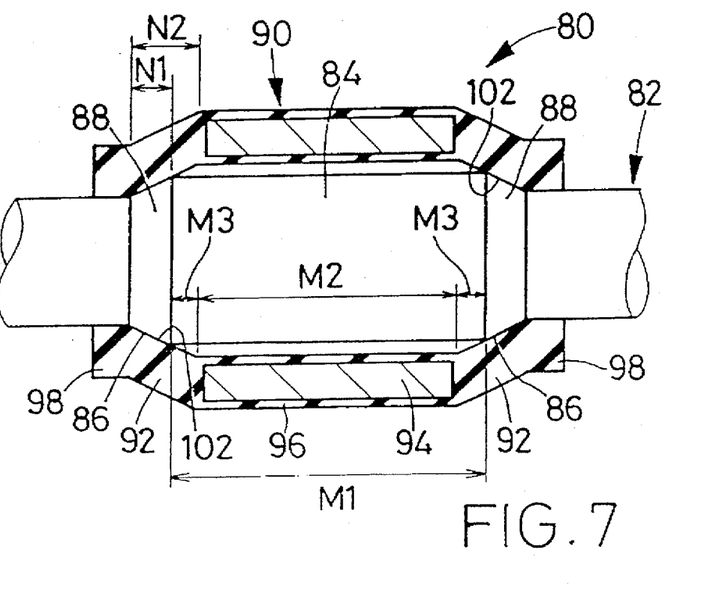
FIG. 7 is an elevational view partly in longitudinal cross section of a dynamic damper as installed on a drive shaft according to a still further embodiment of the invention.

Referring next to FIG. 7, there is shown a drive shaft 82 as an oscillating rod member equipped with a dynamic damper 80 according to a fifth embodiment of the present invention. In FIG. 7, only the dynamic damper 80 is shown in longitudinal cross section.

The drive shaft 82 is a generally long rod member which is hollow or solid and which has a circular shape in transverse cross section. As in the drive shaft 10 of the preceding first embodiment, the drive shaft 82 of this fifth embodiment also has connecting portions and engaging portions (not shown) at axially opposite ends thereof. The dynamic damper 80 is installed on a prescribed portion which is axially intermediate in the drive shaft 82. This prescribed portion of the drive shaft 82 act as an antinode or loop upon application of a vibration to the drive shaft 82. As shown in FIG. 7, the prescribed portion of the drive shaft 82 where the dynamic damper 80 is mounted has a middle portion 84 having an axial length M1 and a relatively large outside diameter. At the axially opposite sides of the middle portion 84, there are formed tapered portions 88, 88 whose outside diameters are reduced in the axially outward directions, so as to provide respective tapered outer circumferential surfaces 86, 86. The tapered portions 88 have an axial length N1. In this fifth embodiment, the middle portion 84 and the tapered portions 88 are formed integrally with the the other portions of the drive shaft 82 by a suitable method such as drawing, forging or machining.

The dynamic damper 80 installed on the thus-constructed drive shaft 82 has a generally cylindrical shape and includes a mass portion 90 formed at an axially middle portion thereof and elastic support members 92, 92 formed integrally with and on the axially opposite sides of the mass portion 90.

The mass portion 90 has a cylindrical mass member 94 formed of a material having a relatively large mass such as a metal, and the outer circumferential surface of the mass member 94 is covered with a thin elastic covering layer 96. The elastic support members 92 are formed of a rubber material such as natural rubber, and have tapered portions whose outside and inside diameters gradually reduce in the axially outward directions. These tapered portions have an axial length N2. The elastic support members 92 are formed so as to extend over a suitable axial length from the respective axially opposite ends of the mass portion 90. Each of the elastic support members 92 has an outer extension 98 formed integrally with the corresponding elastic support member 92 at an axially outer end thereof. The outer extensions 98, 98 has an annular shape and respectively extend from the axially outer ends of the corresponding elastic support members 92 toward the axially outward directions of the drive shaft 82. The elastic support members 92, 92 and the outer extensions 98, 98 are formed integrally with the elastic covering layer 96.

The thus-constructed dynamic damper 80 is fitted onto the drive shaft 82 from one of opposite axial ends thereof, and installed on the the drive shaft 82 such that the mass portion 90 of the dynamic damper 82 is axially aligned with the middle portion 84 of the drive shaft 80 while the elastic support members 92, 92 of the dynamic damper 82 are axially aligned with the respective tapered portions 88, 88 of the drive shaft 80, as shown in FIG. 7.

In the dynamic damper 80, the elastic support members 92, 92 have respective inner circumferential surfaces 102, 102 which are tapered in the axially outward direction, with the inside diameter of the elastic support members 92 reduced in the axially outward directions thereof. The taper angle of the inner circumferential surfaces 102 is predetermined depending upon the tapered angle of the outer circumferential surfaces of the tapered portions 88 of the drive shaft 82. The inside diameter of a portion of each elastic support member 92 whose inner circumferential surface is held in abutting contact with the corresponding tapered outer circumferential surface 88 of the drive shaft 82 is dimensioned to be slightly smaller than the outside diameter of the tapered portion 88, so that the dynamic damper 82 is properly mounted on the drive shaft 80, with the inner circumferential surfaces 102 of the elastic support members 92 held in abutment with the corresponding outer circumferential surfaces 86 of the tapered portions 88, owing to an elastic force the elastic support members 92. Further, in the present embodiment, the outer extensions 98 of the elastic support members 92 have an inside diameter slightly smaller than an outside diameter of the axial sections of the drive shaft 82 which are formed adjacent to the respective axially outer ends of the tapered portions 88, so that the outer extensions 98 are held in abutting contact with the corresponding outer circumferential surfaces of the axial sections of the drive shaft 82, owing to an elastic force of the outer extensions 98. According to this arrangement, the dynamic damper 80 is secured with respect to the drive shaft 82 with increased stability.

The mass portion 90 of the present dynamic damper 80 has an inside diameter which is larger, by a suitable amount, than the largest outside diameter of the tapered portions 88 of the drive shaft 82, i.e., the outside diameter of the middle portion 84. Further, an axial length M2 of the mass member 94 of the mass portion 90 is made smaller, by a suitable amount, than the axial length of the middle portion 84 of the drive shaft 82, i.e., an axial distance M1 between the pair of tapered portions 88, 88. According to this arrangement, each elastic support member 92 has an inner extension at an axially inner portion thereof which extends over the corresponding end part of the middle portion 84 of the drive shaft 82 by an axial length M3, as indicated in FIG. 7. In this arrangement, the inner extensions of the elastic support members 92 92 are not fixed to the outer circumferential surfaces of the tapered portions 88, 88, and therefore, these inner extensions are relatively free from binding forces by the tapered portions 88, 88. In other words, the mass portion 90 of the dynamic damper 80 is elastically supported relative to the drive shaft 82 by these inner extensions of the elastic support members 92, 92. The inner extensions of the elastic support members 92, 92 are subject to shear deformation when the mass portion 90 is displaced in the radial and circumferential direction, due to bending and torsional vibrations received from the drive shaft 82, whereby the dynamic damper 82 exhibits sufficiently soft spring characteristics based on the shear deformation or strain of the inner extensions of the elastic support members 92, 92.

The dynamic damper 80 installed on the drive shaft 82 as described above constitutes a secondary vibration system in which the mass portion 90 serves as a mass and each of the elastic support members 92, 92 serves as a spring. Thus, the present dynamic damper 82 is capable of exhibiting a damping effect with respect to the torsional and bending vibrations of the drive shaft 82 as a primary vibration system, as in the dynamic damper 12 in the preceding first embodiment.

The present drive shaft 82 has tapered portions 88, 88 to which the dynamic damper 80 is fixed at the respective elastic support members 92, 92. This arrangement allows the dynamic dampers 80 having the same dimensions to be installed on various types of the drive shafts which have different outside diameters and axial length values of the drive shafts, provided that the tapered portions 88, 88 of these drive shafts have the same outside diameter. In the dynamic damper 80 of the present embodiment whose elastic support members 92, 92 have respective outer extensions 98, 98, it is desirable that the axial sections of the drive shaft which are formed adjacent to the respective axially outer ends of the tapered portions 88, and on which the outer extensions 98 of the elastic support members 92 are mounted have the same outside diameter value over a suitable axial length.

In the present drive shaft 82 with the dynamic damper 80, the axial length M3 of the inner extensions of the elastic support members 92, 92 of the dynamic damper 80 is adjusted by changing the axial distance M1 between the two tapered portions 88, 88 of the drive shaft 82, whereby the spring constant of the dynamic damper 80 can be suitably tuned as desired.

As in the preceding first embodiment, the present dynamic damper 80 which have the same dimensions and configurations and the same mass of the mass member and the same spring characteristics of the elastic support members can be installed on the various types of the drive shafts which have different dimensions, mechanical strength values and oscillating frequencies to be damped. Further, the present dynamic damper 80 is capable of exhibiting an excellent damping effect with respect to the input vibrations when installed on the various types of drive shafts.

Figure 8:
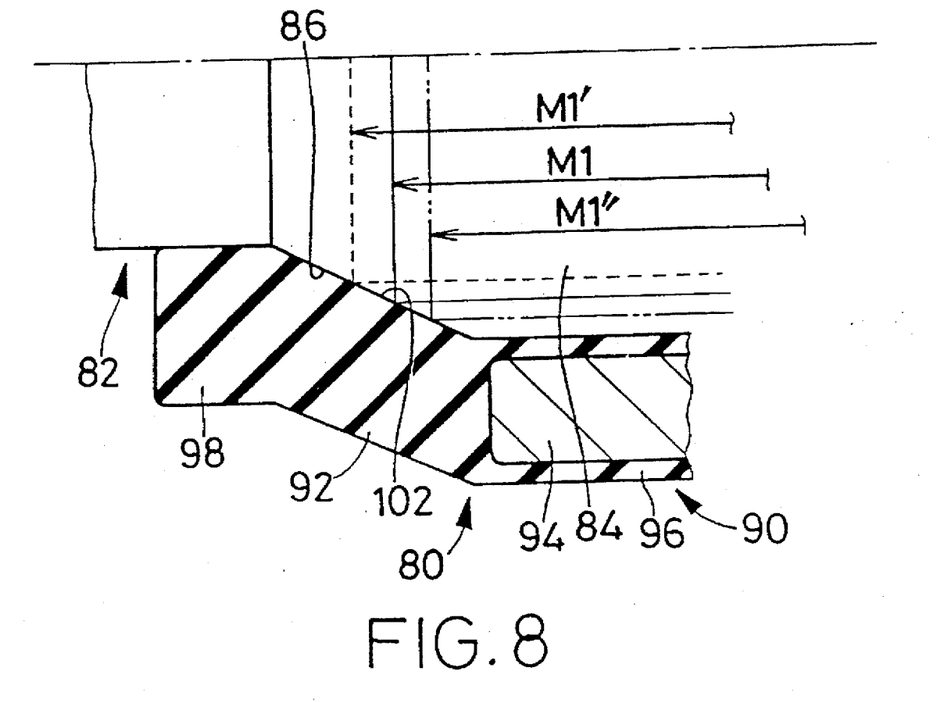
FIG. 8 is an enlarged elevational view partly in longitudinal cross section showing a principal part of the dynamic damper of the drive shaft of FIG. 7, for explaining a manner of tuning the resonance frequency of a secondary vibration system constituted by the dynamic damper as installed on the drive shaft of FIG. 7.
Figure 9:
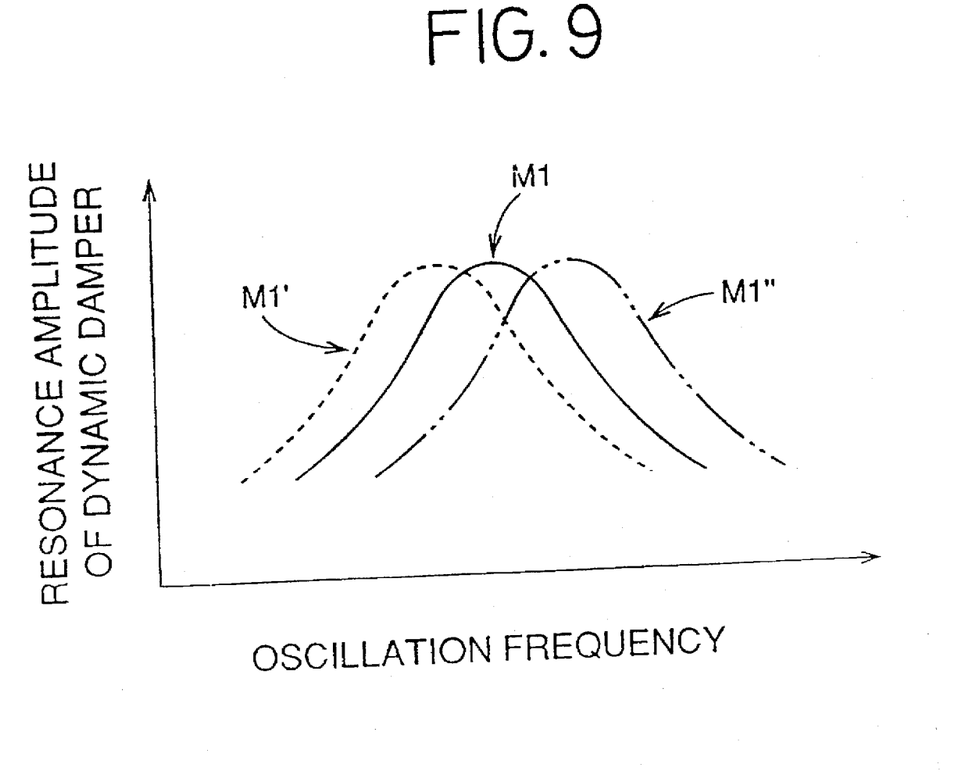
FIG. 9 is a graph which also explains the manner of tuning of the secondary vibration system.

It is noted that the frequency of the input vibrations that can be effectively damped by the dynamic damper 80 is suitably adjusted by changing the axial distance M1 between the pair of tapered portions 88, 88 of the drive shaft 82, as shown in FIGS. 8 and 9. In other words, the resonance frequency of the secondary vibration system constituted by the dynamic damper 80 is suitably determined as desired by changing the axial distance M1. Namely, the resonance frequency of the secondary vibration system is lowered as the axial distance M3 is increased while the resonance frequency is raised as the axial distance M3 is decreased.

In the dynamic damper 80 constructed as described above, the dimension of the elastic support members 92, 92 is suitably determined so that the dynamic damper 80 can be fixedly secured relative to the drive shaft 82 with the elastic support members 92, 92 held in abutting contact with the respective tapered portions 88, 88 of the drive shaft 82, owing to the elastic force of the elastic support members 92, 92. This arrangement permits easier installation of the dynamic damper 80 on the drive shaft 82 with sufficient fixing force, without using the retainer bands as employed in the preceding embodiments.

Further, the elastic support members 92, 92 of the present dynamic damper 80 have the respective outer extensions 98, 98 which are fixed on and held in abutting contact with the respective outer circumferential surfaces of the above-described axial sections of the drive shaft 82, each of the axial sections being located adjacent to the axially outer end of the corresponding tapered portion 88. This arrangement assures further intensified fixing force with which the dynamic damper 82 is secured to the drive shaft 82.

In the present embodiment, the tapered portions 88, 88 are formed as integral parts of the drive shaft 82. This arrangement favorably eliminates preparation of separate components which provide the tapered portions 88, 88 on the drive shaft 82. Further, the axial distance M1 between the two tapered portions 88, 88 can be established with high accuracy. Thus, the present drive shaft 82 equipped with the dynamic damper 80 advantageously offers the intended damping effect with high stability.

Figure 10:
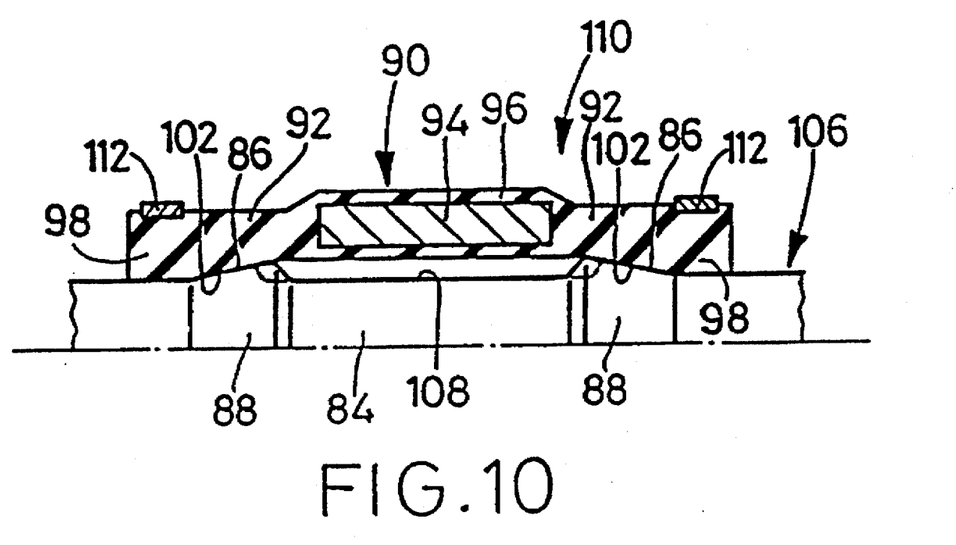
FIG. 10 is an elevational view partly in longitudinal cross section of a dynamic damper as installed on a drive shaft according to a yet further embodiment of the invention.

Referring next to FIG. 10, there is shown a drive shaft generally indicated at 106 which is equipped with a dynamic damper 110 according to a sixth embodiment of the invention. In this sixth embodiment, the same reference numerals as used in the preceding fifth embodiment are used to identify the corresponding components and detailed description of which may be dispensed with.

In the present drive shaft 106, the middle portion 84 defined by and between a pair of tapered portions 88, 88 has an outside diameter which is smaller than the largest diameter of the tapered portions 88, 88. In this arrangement, there is formed an annular space 108 between an inner circumferential surface of a mass portion 90 of the dynamic damper 110 and an outer circumferential surface of the middle portion 84 of the dynamic damper 106. The two elastic support members 92, 92 of the dynamic damper 110 mounted on the drive shaft 106 have respective outer circumferential surfaces whose diameter is substantially constant over an entire axial length thereof as shown in FIG. 10. The above-constructed dynamic damper 110 is secured to the drive shaft 106 by means of a pair of retainer bands 112, 112 which are fixed on respective outer circumferential surfaces of the outer extensions 98, 98 of the elastic support members 92, 92.

In the present embodiment, too, the dynamic damper 110 which have the same dimensions can be installed on the various types of the drive shafts, provided that the tapered portions 88, 88 of these drive shafts have the same outside diameter value. Further, the spring constant of the dynamic damper 110 can be suitably tuned as desired, by changing an axial distance between the two tapered portions 88, 88, in other words, an axial length of the annular space 108. This arrangement favorably permits the same dynamic damper to be installed on the various type of the drive shafts having different dimensions, mechanical strength values and oscillation frequencies to be damped.

In the drive shaft 106 according to the present embodiment, the middle portion 84 defined by and between the two tapered portions 88, 88 have the outside diameter smaller than the largest outside diameter of the tapered portions 88, 88, to thereby provide the annular recess 108 as described above. This arrangement contributes reduction in the overall weight of the drive shaft 106.

While the present invention has been described in detail with its presently preferred embodiments for the illustrative purpose only, it is to be understood that the invention is not limited to the details of the illustrated embodiments, but may be otherwise embodied.

For instance, the large-diameter portions 22 in the drive shafts 10 and 50 or the tapered portions 88 in the drive shafts 82, 106 may be formed by preparing separate annular or cylindrical members which give the large-diameter portions 22 or the tapered portions 88, and attaching these members to the corresponding drive shafts 10, 50, 82 and 106. Each of these annular or cylindrical members for the large-diameter portions 22 or the tapered portions 88 may consist of two or more arcuate segments which cooperate to give the large-diameter portion 22 or the tapered portions 88.

The drive shafts 10, 50 may have a constant outside diameter substantially equal to the outside diameter of the large-diameter portions 22, at their axial portions from the large-diameter portion 22 to the connecting portion 14.

Further, the engaging means 40, 40 for properly positioning the dynamic damper 38 relative to the drive shaft 10 in the axial direction may be otherwise constituted. For example, the outer circumferential surfaces of the large-diameter portions 22 of the drive shaft 10 may have one or more projections or grooves which are adapted to be held in engagement with corresponding one or more grooves or projections formed in the inner circumferential surfaces of the elastic support members 26 of the dynamic damper 12.

The dynamic damper of the present invention may have a foldable structure as disclosed in the above-described U.S. Pat. No. 5,056,763, wherein the dynamic damper has an axial slit formed through the thickness thereof, and a foldable portion diametrically opposite to the slit. The slit and the foldable portion cooperate with each other to divide a mass member into two semi-cylindrical half sections in the circumferential direction of the dynamic damper. This arrangement permits the two half sections of the mass member to be pivoted about the foldable portion such that the ends of the two half sections which define the slit are moved toward and away from each other. In this arrangement, therefore, the dynamic damper is not required to be moved axially on the drive shaft from one of the opposite axial ends of the latter. That is, the dynamic damper is easily installed in position on the drive shaft, by first opening the two semi-cylindrical half sections of the mass member at the above-indicated ends, with the half sections pivoted about the foldable portion, then placing the half sections above and below the upper and lower circumferential portions of the shaft, and finally closing the half sections. Thus, the damper may be mounted on the shaft in the radial direction.

The drive shaft of the present invention may be provided with a projection formed of an elastic material which projects from one of the drive shaft and the mass portion of the dynamic damper toward the other one of the drive shaft and the mass portion in the radial direction perpendicular to the axis of the drive shaft or the mass portion. The projection may be provided for the purpose of tuning the resonance frequency of the secondary vibration system constituted by the dynamic damper, as disclosed in the above-indicated U.S. Pat. No. 5,056,763 and laid-open Publication No. 2-62442 of unexamined Japanese Patent Application.

Although, in the illustrated first and second embodiments, the dynamic dampers 12 and 38 have an inside diameter which is constant over the entire axial length, the principle of the present invention is equally applicable to the conventional dynamic damper wherein the inside diameter of the mass portion is made larger than that of the elastic support members, as disclosed in the above-identified U.S. Patent and the Japanese Publication.

In the illustrated first embodiment, the axial length L2 of the mass member 28 of the dynamic damper 12 is made smaller than the axial length L1 of the small-diameter portion 20 of the drive shaft 10. However, the axial length L2 of the mass member 28 may be made larger than the axial length L1 of the small-diameter portion 20 when the elastic covering layer 30 has a relatively large thickness, for instance.

In the illustrated fourth embodiment, the drive shaft 60 is equipped with the dynamic damper 64 having two mass members, i.e., the first and second mass members 66, 68. However, the dynamic damper 64 may be provided with three or more mass members. In the dynamic damper having two or more mass members as described above, the resonance frequencies of Secondary vibration systems which are constituted by the respective mass members can be tuned by suitably determining the spring constants of the elastic support members and elastic connecting portions, in place of or in addition to suitably adjusting the mass of each mass member.

In the illustrated fifth and sixth embodiments, the dynamic dampers 80, 110 have the elastic support members 92 each of which has the outer extension 98 formed integrally with the corresponding elastic support member 92 at the axially outer end portion thereof. However, the elastic support members 92 need not have the outer extensions 98. It is possible to fixedly install the dynamic dampers 80, 110 in position relative to the drive shafts 82, 106, owing to the abutting contact of the inner circumferential surfaces 102, 102 of the elastic portions 92, 92 and the corresponding outer circumferential surfaces 86, 86 of the tapered portions 88, 88 of the drive shafts 82, 106.

Although the specific embodiments of the drive shaft equipped with the dynamic damper for use in a motor vehicle have been described above, the invention is not limited to the illustrated embodiments, but the principle of the invention is equally applicable to a propeller shaft of a motor vehicle, and various kinds of oscillating rod member such as a power transmission shaft and a conduit whose application is not limited to the motor vehicle.

It is also to be understood that the present invention may be embodied with various changes, modifications and improvements which may occur to those skilled in the art, without departing from the spirit and scope of the invention defined in the following claims.

What is claimed is:

1. A rod-damper combination comprising:

an oscillating rod member including a middle portion, and a pair of tapered portions axially spaced apart from each other by said middle portion, said tapered portions having respective tapered outer circumferential surfaces whose outside diameters decrease in axially outward directions of said rod member away from said middle portion; and a dynamic damper including (i) a mass portion having a substantially cylindrical shape and including a mass member, and (ii) two elastic support members formed integrally with and on axially opposite sides of said mass portion to elastically support said mass portion with respect to said rod member, said mass member of said mass portion having an axial length that is smaller than an axial length of said middle portion of said rod member, said two elastic support members of said dynamic damper having respective tapered inner circumferential surfaces, said dynamic damper being positioned on said oscillating rod member such that said tapered inner circumferential surfaces of said two elastic support members are held in abutting contact with said tapered outer circumferential surfaces of said tapered portions of said rod member, respectively, and such that said mass portion is diametrically outwardly spaced from said middle portion of said rod member by a predetermined distance while said mass member is disposed within said axial length of said middle portion.

2. A rod-damper combination according to claim 1, wherein said pair of tapered portions of said rod member are formed integrally with the other portions of said rod member.

3. A rod-damper combination according to claim 1, wherein said pair of tapered portions of said rod member have the largest diameter of said rod member.

4. A rod-damper combination according to claim 1, wherein said middle portion of said rod member has a diameter substantially equal to the largest diameter of said tapered portions.

5. A rod-damper combination according to claim 1, wherein said middle portion of said rod member has a diameter smaller than the largest diameter of said tapered portions.

6. A rod-damper combination according to claim 1, wherein said two elastic support members of said dynamic damper have respective tapered outer circumferential surfaces whose outside diameters reduce in said axially outward directions of said rod member.

7. A rod-damper combination according to claim 1, wherein said two elastic support members of said dynamic damper have respective tapered outer extensions which extend from respective axially outer ends of said elastic support members in said axially outward directions of said rod member, said outer extensions being held in abutting contact with respective outer circumferential surfaces of axial portions of said rod member which are formed adjacent to respective axially outer ends of said tapered portions of said rod member.

* * * * *